United States Patent [19]
Grishin et al.

[11] Patent Number: 5,952,260
[45] Date of Patent: Sep. 14, 1999

[54] CATALYTIC SYSTEM FOR CELLULOSE ACYLATION, PROCESS FOR PRODUCING SAID CATALYTIC SYSTEM, AND FOR ITS PRACTICAL APPLICATION

[75] Inventors: Eduard Pavlovich Grishin; Valentin Ananievich Bondar; Dmitry Petrovich Mironov; Anatoly Ivanovich Shamolin, all of Vladimir, Russian Federation

[73] Assignee: Nauchno-proizvodstvennaya firma "Efiry Tselljulosy", Vladimir, Russian Federation

[21] Appl. No.: 08/654,353

[22] Filed: May 28, 1996

Related U.S. Application Data

[63] Continuation-in-part of application No. 08/295,662, filed as application No. PCT/RU93/00307, Dec. 17, 1993, abandoned.

[30] Foreign Application Priority Data

Dec. 25, 1992 [RU] Russian Federation ............. 92014660
Dec. 25, 1992 [RU] Russian Federation ............. 92014662

[51] Int. Cl.$^6$ .................................. B01J 3/02; B01J 3/04
[52] U.S. Cl. ............................ 502/167; 502/170
[58] Field of Search .................................... 502/150, 167, 502/170; 536/124

[56] References Cited

U.S. PATENT DOCUMENTS

| | | |
|---|---|---|
| 2,175,103 | 10/1939 | Berl . |
| 2,536,634 | 1/1951 | Fraizy . |
| 2,705,710 | 4/1955 | Blume . |
| 2,976,277 | 3/1961 | Touey . |
| 4,366,232 | 12/1982 | Buser et al. .............................. 430/390 |

FOREIGN PATENT DOCUMENTS

| | | |
|---|---|---|
| 57-35451 | 11/1987 | Japan . |
| 1237671 | 6/1986 | U.S.S.R. . |

OTHER PUBLICATIONS

Chemical Abstracts, V. 52, No. 14, Jul. 25, 1958, p. 14169a.
Aldrich Catalog, product literature of Aldrich Chemical Co., pp. 2–3; 482–483, 1992.

*Primary Examiner*—Jeffrey C. Mullis
*Attorney, Agent, or Firm*—Collard & Roe, P.C.

[57] ABSTRACT

A catalytic system for cellulose acylation includes an adduct of sulfuric acid with N,N-dimethylacetamide, a lower fatty acid having from two to four carbon atoms, and free sulfuric acid or free N,N-dimethyl-acetamide. A mole ratio of the system components per mole of the adduct is presented. The catalytic system also includes an adduct of perchloric acid with N,N-dimethylacetamide for use in cellulose reactions with propionic or butyric anhydride. Method for preparing the catalytic system includes the use of hydrous sulfuric acid or sulfuric and perchloric acids, and N,N-dimethylacetamide and include reacting hydrous sulfuric acid or sulfuric and perchloric acids with N,N-dimethylacetamide in the presence of a lower fatty acid anhydride in an amount of 1 mole per mole of water contained in the reactants in the absence of cellulose at a temperature of from 0° C. to 25° C. Mole ratios of the reactants for preparing the catalytic system per mole of sulfuric acid are presented.

4 Claims, No Drawings

5,952,260

CATALYTIC SYSTEM FOR CELLULOSE ACYLATION, PROCESS FOR PRODUCING SAID CATALYTIC SYSTEM, AND FOR ITS PRACTICAL APPLICATION

CROSS-REFERENCE TO RELATED APPLICATION

This patent application is a Continuation-In-Part of U.S. patent application Ser. No. 08/295,662 filed Aug. 25, 1994 now abandoned, which is a 371 of PCT/RU93/00307 filed Dec. 17, 1993.

BACKGROUND OF THE INVENTION

1. Field of the Invention

The present invention relates to a catalytic system for cellulose acylation and to processes for producing said catalytic system and its application for cellulose acylation and synthesis of acetone-soluble primary cellulose acetates.

The aforesaid catalytic system incorporates as the base an adduct of sulfuric acid and N,N-dimethylacetamide. There is no direct reference to the presence or formation of this adduct in the reaction medium for producing cellulose esters. At the same time, a number of patents describe nonindustrial processes for synthesis of cellulose esters, wherein this adduct may be formed and may function as a specific catalyst. Such processes are recommended for carrying into effect an accelerated process of cellulose acetylation at high temperatures, with the maintaining of a high degree of polymerization of the product obtained.

Cellulose esters produced with the use of this catalytic system are used in traditional fields, e.g., for producing artificial fibers, cigarette stick, cine and photographic materials, commercial and household-use plastics, lacquers and varnishes, surface-coating materials, and for other applications.

2. The Prior Art

U.S. Pat. No. 2,705,710 discloses a cellulose acetylation process which, (since no direct reference is given in this patent) incorporates formation of an adduct of sulfuric acid with N,N-dialkylamide (DAA) selected from the group consisting of N,N-dimethylformamide (DMFA), N,N-diethylformamide (DEFA), N,N-dimethylacetamide (DMAA), and N,N-diethylacetamide (DEAA). This adduct is dissolved in a large quantity of the respective amide. The inventors have to use a large proportion of amide (450 moles per mole of sulfuric acid) which enables one to suppress an excessively high-temperature dissociation of the adduct into free sulfuric acid and amide, thereby retaining an increased degree of polymerization of the cellulose triacetate being synthesized. This, however, results in too high an acetylation module and therefore complicates the process of regeneration of a mixture of a large number of solvents (acetic acid and N,N-dialkylamide).

Fraizy, U.S. Pat. No. 2,536,634 discloses a method for cellulose acetylation wherein cellulose is first treated with acetic acid, acetic anhydride and sulfuric acid. It is then treated with an acetylating mixture comprising acetic anhydride and sulfuric acid. 30.0 minutes later compounds of a basic character and used for partial or complete neutralization of sulfuric acid are added to the reaction medium. In particular, acetic acid is added, and this acid comprises acetamide in terms of 1.0 mole of acetamide per 1.0–2.0 moles of sulfuric acid.

The Fraizy method has the following disadvantages which do not permit to:

(a) implement commercial procedures with very low module, about 3.0 since the module used in the Fraizy method which is considerably higher, approximately 8.0–10.0 can not be reduced due to relatively low temperatures at the acetylation stage, at which temperatures only the Fraizy method can be implemented;

(b) produce cellulose acetates having a higher degree of polymerization since in this method at the beginning of cellulose treatment with the acetylating mixture (within the first 30 minutes), when the reaction proceeds in the presence of the total amount of sulfuric acid, the degree of cellulose polymerization decreases to a considerable extent; and (c) control the degree of substitution of cellulose acetates during the acetylation process and to obtain acetone-soluble primary cellulose acetates, since this prior art method can not use large enough quantities of sulfuric acid required for achieving the specific goals.

U.S. Pat. No. 2,976,277 describes a process for producing primary acetone-soluble cellulose acetates, using a titanium compound as the catalyst, wherein a "homogeneous" acetylation mechanism takes place. A disadvantage inherent in this process resides in that acetylation is conducted in the medium of acetic anhydride with a high module of acetylation equal to 13, the amount of acetic anhydride used being more than 7 times that required according to theory. In addition, the process is conducted at rather high temperatures equal to 136° C.–137° C.

One prior art process for producing primary low-substituted cellulose esters is described in Japanese Patent No. 57-35,451. This process features homogeneous cellulose acylation conditions (in a cellulose solution in N,N-dimethylacetamide with lithium chloride), and the resultant formation of low-substituted cellulose esters, including cellulose acetate soluble in an acetone-water mixture, the acetylation module being about 40. This prior art process, however, fails to produce primary acetone-soluble cellulose acetates and features a complicated process of regeneration of a mixture of great amounts of solvents, i.e., N,N-dimethylacetamide and acetic acid.

One more prior art process for producing acetone-soluble primary cellulose acetates is known (*Chemical Abstracts*, V. 52, No. 14, Jul. 25, 1958, p. 14169a), wherein the process is conducted in a medium containing acetic acid and acetic anhydride, with a much lower acetylation module than specified above, that is, 8 at a temperature of below 33° C. According to this prior art process, cellulose acetylation is carried out in the presence of a large amount of free sulfuric acid, i.e., 20%–45% of the weight of cellulose. A disadvantage of the process is a relatively low degree of polymerization of the resultant product, that is, 160, as well as comparatively high acetylation module equal to 8.

Soviet Union Patent No. 1,237,671 discloses a process for producing primary cellulose acetates in a medium of N,N-dimethylformamide and used as the catalyst is a mixture called a "complex" by the inventors, comprising 600–800 wt.pt. of N,N-dimethylformamide and 20–40 wt.pt. of sulfuric acid. Primary cellulose acetates are produced as follows: the parent cellulose is activated with this "complex" at 60° C.–80° C. for one hour, whereupon acetylation is carried out in the presence of this "complex". The resultant product is subjected to desulfation, the catalyst is neutralized, and the end product is extracted by a conventional technique. The end product is acetone-soluble and has a specific viscosity of 0.36–0.68. Disadvantages of the process reside in a high acetylation module equal to 10 and a complicated process of regeneration of a mixture of a great amount of solvent, i.e., N,N-dimethylformamide and acetic acid. In addition, this prior art patent contains an inexact information about the composition of the "complex" used, which is apparently a solution of the adduct of N,N-dimethylformamide and sulfuric acid in N,N-dimethylformamide.

SUMMARY OF THE INVENTION

It is an object of the present invention to provide a catalytic system which is capable of synthesizing cellulose esters with a minimized acylation module equal to 3–7, preferably 3.0–5.0, in a medium of a lower fatty acid—anhydride of a lower fatty acid.

The foregoing object is accomplished due to the provision of a catalytic system for cellulose acylation, said system comprised in an acylating mixture composition and comprising an adduct of sulfuric acid with N,N-dimethylacetamide as well as free sulfuric acid or free N,N-dimethylacetamide with the following mole ratio of the components:

adduct of sulfuric acid
with N,N-dimethylacetamide 1.00
free sulfuric acid, max., or 0.49
free N,N-dimethylacetamide, max. 0.40.

The principal component of the catalytic system of the invention is an adduct, i.e., an equimolar complex compound of sulfuric acid with N,N-dimethylacetamide.

It has now been discovered that this complex in a catalytic system with free sulfuric acid incorporates an N-cation, and the use of free N,N-dimethylaceatamide in the catalytic system of the invention results in formation of a complex containing both an N-cation and O-cation at a time, whereas the N-cation alone is present in an equimolecular system.

It has also been discovered that an adduct with an N-cation is less stable than an adduct containing both an N-cation and O-cation. This fact is evidenced by a difference, of more than two orders of magnitude, between the values of instability constants of the complex with an N-cation and with an O-cation, calculated by the calorimetric titration technique (at a temperature of 25° C. and concentration of the titratable component in acetic acid equal to 0.05 M/l).

The complex composition has been studied by us with the use of IR-spectroscopy in the region of carbonyl group valence vibrations. In this case, the spectrum of a complex with an N-cation is featured by an absorption band of 1700 $cm^{-1}$, and the spectrum of a complex containing an O-cation has an absorption band of 1600 $cm^{-1}$.

The other important component of the proposed catalytic system is free sulfuric acid or free N,N-dimethylacetamide. The catalytic system containing free sulfuric acid has a greater number of protons which are formed due to both free sulfuric acid and lower stability of the complex with an N-cation. This catalytic system is more active in the cellulose acylation processes than a system containing free N,N-dimethylacetamide.

The limit values of the ratio between the components of the proposed catalytic system which determine its practical application for cellulose acylation processes, have been selected experimentally.

Any extension of the thus-selected limits of the values of the ratio between components of the herein-proposed catalytic system results in a reduced degree of polymerization of the finished product and/or an increased duration of the cellulose acylation process.

Similarly, the use of a catalytic system containing an adduct alone of sulfuric acid with N,N-dimethylacetamide (without their excess amount) fails to yield any gain both in a higher degree of polymerization of the finished product and in a reduced time of the cellulose acylation process.

The herein-proposed catalytic system of the invention may also incorporate an adduct of perchloric acid with N,N-dimethylacetamide in an amount of 50 wt. % of the amount of an adduct of sulfuric acid with N,N-dimethylacelamide. This catalytic system is recommended for synthesis of mixed cellulose esters (i.e., cellulose aceto-proprionates and acetobutyrates), because this catalytic system enables one to complete the cellulose acylation reaction using butyric anhydride or propionic anhydride which are less chemically reactive compared with acetic anhydride. The aforesaid ratio between the components of a catalytic system comprising an adduct of perchloric acid with N,N-dimethylacetamide, provides for a synthesis of mixed cellulose esters featuring high substitution with respect to butyric acid or propionic acid and a low acetylation module. Any change in this ratio between the adducts of sulfuric acid and perchloric acid adversely affects the quality of the finished product.

Depending on a production process applied the herein-proposed catalytic system may additionally comprise a lower fatty acid having from 2 to 4 carbon atoms (that is, acetic acid, propionic acid and/or butyric acid) in an amount equal to 2 moles per mole of water contained in the parent components, or in an amount of not more than 14.0 moles per 1.0 mole of an adduct of sulfuric acid with N,N-dimethylacetamide.

The process for producing the herein-proposed catalytic system consists in that sulfuric acid is made to react with N,N-dialkylacetamide in an anhydrous medium, wherein, according to the invention, the N,N-dialkylacetamide used is N,N-dimethylacetamide, and the process is conducted in the absence of cellulose at a temperature of 0° C.–25° C. and with the following mole ratio of the parent components:

sulfuric acid: 1.0
N,N-dimethylacetamide 0.67–1.40

When preparing the catalytic system, 0.67–1.40 moles of DMAA are taken per mole of sulfuric acid. The present catalytic system is prepared under anhydrous conditions.

Such anhydrous conditions can be established either by using water-free parent components or by adding an aliphatic-acid anhydride in an amount of at least one mole of the anhydride per mole of water for this water removal by anhydride hydration.

According to the invention, the catalytic system is prepared from N,N-dimethylacetamide and sulfuric acid independently, outside the reaction medium containing cellulose. This makes it possible to prevent production of a substandard cellulose ester under low-module conditions, since there are avoided non-uniform processes of cellulose destruction and acylation which are caused by two concurrently proceeding reactions, i.e., anhydride hydration and adduct formation. Heat released during adduct formation and anhydride hydration, when preparing the proposed catalytic system, is withdrawn by cooling the system in such a way as to maintain its temperature between 0° and 25° C., thereby reliably controlling the process for producing a quality end product.

Sulfuric acid, which is one of the key parent components of the catalytic system of the invention, is selected on account of its being a strong mineral acid which, when in the composition of the present catalytic system, forms sulfoesters together with cellulose, thus rendering cellulose acetylation in a reaction running the "homogeneous" mechanism and ultimately contributing to realization of a low-module process.

The other important parent component of the catalytic system of the present invention is N,N-dimethylacetamide which occupies an extraordinary position in the series of N,N-dialkylamides of a lower fatty acids having 1 to 2 carbon atoms as being a specific solvent. As sulfuric acid is added to cellulose during its acylation, N,N-dimethylacetamide passes from the adduct to a free state, increases its concentration in the acylation bath, thereby adding to the dissolving capacity of the liquid phase with respect to the cellulose acetosulfate formed. The aforesaid specific features of N,N-dimethylacetamide provide a unique possibility of carrying out a low-module cellulose acylation process at relatively low temperatures for an adequately short period of time.

One more component of the catalytic system of the invention is perchloric acid which is used as the strongest heretofore-known cellulose acylation catalyst. Perchloric acid is used in an amount of 50.0 wt. % of the amount of sulfuric acid. The catalytic system, wherein apart from sulfuric acid used is made of perchloric acid, is prepared in the presence of a lower fatty acid anhydride.

The herein-proposed catalytic system based on the adduct of sulfuric acid, perchloric acid, and N,N-dimethylacetamide enables one to carry out low-module cellulose acylation processing producing acetopropionates of cellulose and acetobutyrates of cellulose.

The herein-proposed process for cellulose acetylation at low module comprises cellulose treatment (activation) with acetic acid, preparation of a catalytic system and an acetylating mixture, acetylation of activated cellulose with this acetylating mixture comprising at least a catalytic system and acetic anhydride. According to the invention, preparation of the catalytic system is conducted in the absence of cellulose; an adduct of sulfuric acid with N,N-dimethylacetamide and free sulfuric acid with mole ratio of 1.0: max 0.49 are used as a catalytic system. This system is added to the acetylating mixture in an amount of about 1.5 wt. % of cellulose weight (in terms of sulfuric acid) and the acetylation of activated cellulose is conducted with module about 3.0.

It is noteworthy that when the catalytic system of the invention is used in an amount of about 1.5 wt. %, the resultant cellulose triacetate is liable to gelatinize; that is why cellulose triacetate must be hydrolyzed before gelatination occurs.

With low module preferable use may be made in the proposed process of powdered cellulose, such as, e.g., wood or cotton cellulose. Along with retaining the principal requirements imposed upon the known cellulose grades for acetylation, it is also recommended that powdered cellulose have a bulk density in the range of 90–105 kg/cu.m and an adequately high degree of polymerization (not below 1200).

Use of powdered cellulose is especially efficient when the process is carried out in a reactor having high shear forces because this makes it possible to solve the problems of flows synchronization in the cellulose-liquid system which is indispensable in high-efficiency continuous processes for cellulose acetate production.

This becomes practicable due to a combined use of acetic acid as an activator, and the proposed catalytic system. To carry out the cellulose acylation process with a module of 3, it is expedient to use reactors featuring high shearing forces. With such a low acylation module the reaction medium is acetic anhydride, that is, the process occurs virtually without use of any organic solvents.

The present catalytic system should be used in an amount of 7–30% of the cellulose weight in terms of sulfuric acid and is applied with the following mole ratio of its components:

adduct of sulfuric acid
with N,N-dimethylacetamide 1.0
free N,N-dimethylacetamide 0.1–0.4.

This catalytic system enables one to change, during the cellulose acetylation process, both the fixed acetic acid (i.e., degree of substitution) content of the resultant cellulose acetate and the degree of its polymerization, the latter being determined by the ratio between the adduct and the free N,N-dimethylacetamide in the system. The degree of substitution depends on the amount of the adduct used and is in an inverse relationship therewith. It is also associated with the amount of the transesterified cellulose sulfoesters which, in turn, depends on the temperature and the "syrup" residence time at the stage of acetylation. The cellulose acetylation process in the presence of the proposed catalytic system proceeds under the conditions approximating the homogeneous ones, which results in a more uniform distribution of the acetic-acid and sulfuric-acid residues along the chains of the macromolecules of the resulting cellulose acetosulfate. This is corroborated by the partially acetylated cellulose specimens obtained according to the invention in the presence of the proposed catalytic system, which contain much less amount of crystalline cellulose fraction unhydrolyzable with boiling 2.5N hydrochloric acid than the specimens of the same degree of substitution produced by the so-called homogeneous process.

In our opinion, a principal prerequisite for production of soluble primary cellulose acetates is a leading destruction of the cellulose crystalline structure (rendering it amorphous) accompanied by an increase in the number of hydroxyl groups accessible to reagents and by a greater proportion of the partially substituted units of macromolecules and their faster rendering into solution.

In the process of the invention for cellulose acetylation, in order to obtain cellulose acetates having a higher degree of polymerization and a controllable degree of substitution, the ratio between the liquid phase and the cellulose (module) is selected such that it equals 3.6–7.0:1.0, preferably 3.6–5.0:1.0.

When the cellulose acetylation process is conducted with a module of 3.6 to 7, the concentration of the reactants is increased, which cuts down the duration of the process, increases filterability and degree of polymerization of the finished product. Moreover, it is the "homogeneous" cellulose acetylation mechanism that is realized in this case, which provides a possibility of producing acetone-soluble primary cellulose acetate.

One of the advantages of the proposed process is a possibility of modernizing the now-existing industrial processes for producing cellulose acetates aimed at dispensing with, partially or completely, organic solvents, acetic acid, and methylenechloride in the reaction sphere. Thus, reduction of the acetylation module to 3.6–5.0 in the acetic-acid processes for producing cellulose acetates sakes it possible to reduce the amount of acetic returned for regeneration by 1.5–2.5 times.

The selected range of the acetylation module values is an optimum one. Changing to either side of this optimum range will result in providing a substandard end product or will result in a considerable deterioration of the economic indices of the proposed cellulose acetylation process.

The other field for application of the proposed catalytic system is for producing acetone-soluble primary cellulose acetates having a higher degree of polymerization. This process comprises cellulose activation with acetic acid, preparation of the catalytic system and the acetylating mixture, acetylation of the activated cellulose with the acetylating mixture comprising at least the catalytic system and acetic anhydride. Treatment of the resultant cellulose acetate with water is followed by isolation of the end product; wherein, according to the invention, preparation of the catalytic system is conducted in the absence of cellulose. An adduct of sulfuric acid with N,N-dimethylacetamide and free N,N-dimethylacetamide with a mole ratio of 1.0:0.2–0.4 are used as a catalytic system. This system is added to the acetylating mixture in the amount of 20.0–30.0 wt. % of cellulose weight (in terms of sulfuric acid); acetylating of activated cellulose with said acetylating mixture at a temperature of 10° C.–90° C. and module equal to 4.0–7.0, preferably 4.0–5.0. Further treatment of the resultant cellulose acetate is performed with water, acetic acid and magnesium acetate or sodium acetate in two stages:

at the first stage, treatment is carried out at a temperature of 70° C.–85° C. for 1–2 hours with 20.0–50.0 wt. pt. of water, 25.0–50.0 wt. pt. of acetic acid and 10.0–40.0 wt. pt. of magnesium or sodium acetate per 100.0 wt. pt. of cellulose; and at the second stage, treatment is performed at a temperature of 65° C.–70° C. for 1.0–2.0 hours with 45.0–100.0 wt. pt. of water, 45.0–105.0 wt. pt. acetic acid per 100.0 wt. pt. of cellulose.

The aforementioned two-stage treatment is aimed at desulfation, that is, splitting off the bound sulfuric acid making up part of the cellulose acetate and reestablishing free hydroxyl groups instead. At the first stage, the content of bound sulfuric acid is reduced to tenth fractions of a percent, after which the resultant cellulose acetate becomes soluble in acetone.

The process parameters recommended at the first stage of treatment of the resultant cellulose acetate and concerned with water concentration, the catalyst used, the temperature and duration of the process have been found experimentally and are the optimum ones under conditions of a low module.

The second stage is aimed at further reduction of the bound sulfuric acid content. This is attained due to a higher water concentration in the reaction mixture, thus making it possible to shift the reversible reaction of saponification of the sulfo groups in a required direction.

Using the parameters that we have found experimentally and recommend for the second stage, it is possible to decrease the bound sulfuric acid content of the finished product to hundredth fractions of percent. As distinct from the first stage of treatment, some saponification of the acetate groups occurs in the second-stage treatment.

Practical application of the proposed catalytic system of the aforestated composition, low module and corresponding temperature profile of the process in acetylation enables one to attain an optimum ratio between acetylation rates and cellulose destruction and thus to obtain the degree of polymerization of the finished product within 250 and 500.

If it is assumed that the rate of cellulose destruction in the course of its acetylation depends on the concentration of protons, it becomes easily understood why a possibility arises for controlling the degree of polymerization of the finished product in the presence of the proposed catalytic system. At the same time, the proposed catalytic system makes it possible to carry out synthesis of the soluble primary cellulose acetates. Presented below is a diagrammatic representation of the cellulose acetylation mechanism we have suggested. The principal part played by the adduct consists is bonding sulfuric acid into a strong complex that diminishes considerably the concentration of free sulfuric acid and its protons. As regards the cellulose sulfation process, it may proceed with participation of said complex or of free sulfuric acid. N,N-dimethylacetamide, in its turn, is an acceptor and carrier of protons with which it interchanges with acetic anhydride and acetic acid.

REACTION PATTERNS

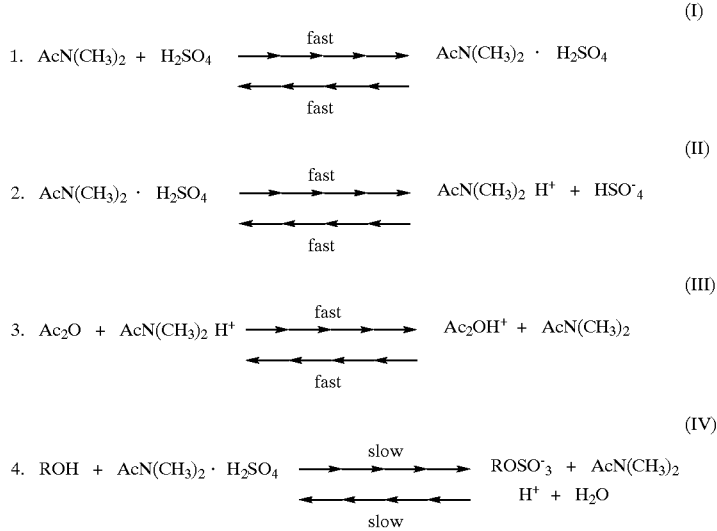

-continued

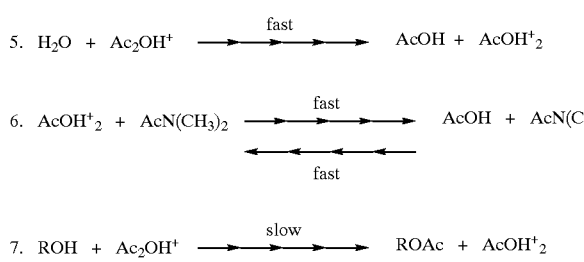

After desulfation the resultant acetate is completely soluble in acetone and is featured by a reduced viscosity of concentrated solutions thereof (that is, 1.5–2 times lower than that of diacetate produced according to the known so-called homogeneous process) and by a high filterability of acetone solutions which gives evidence of a chemical and physical homogeneity of the polymer being synthesized.

The aforementioned limits of the synthesis conditions provide for production of the acetone-soluble finished product, reduction of the acetylation module, sulfuric acid consumption and that of N,N-dimethylacetamide, as well as reduction of the amount of acetic acid forwarded for recovery.

One more field for the application of the catalytic system of the invention is for producing mixed cellulose esters, such as acetopropionates and acetobutyrates with low module. The process of the invention comprises activation of cellulose with acetic acid, preparation of a catalytic system and the acylating mixture, acylation of activated cellulose with the acylating mixture comprising at least the catalytic system and propionic anhydride or butyric anhydride, followed by hydrolysis and isolation of the end product. Wherein according to the invention, preparation of catalytic system is conducted in the absence of cellulose, and an adduct of sulfuric acid with N,N-dimethylacetamide, an adduct of perchloric acid with N,N-dimethylacetamide in the amount of 0.5 mole and free N,N-dimethylacetamide in the amount of max. 0.1 mole per 1.0 mole of an adduct of sulfuric acid with N,N-dimethylacetamide are used as the catalytic system. This system is added to the acylating mixture in the amount of 10.0–20.0 wt. % of sulfuric acid and 5.0–10.0 wt. % of perchloric acid in terms of said acids. Acylation is performed at a temperature of 10° C.–90° C., and module of about 5.0.

The proposed catalytic system offers unique possibilities for realization of an industrial process for the synthesis of cellulose esters with the lowest acylation module equal to 3–7 in a medium extensibly applicable in industrial practice, consisting of a lower fatty acid anhydride and a lower fatty acid, virtually without the use of any organic solvents.

The cellulose acetylation process and the process for producing acetone-soluble cellulose acetates according to the invention make it possible to synthesize:

(a) soluble primary cellulose acetates formed according to the "homogeneous" mechanism;
(b) cellulose acetates having an increased degree of polymerization equal to 300–500;
(c) cellulose acetates featured by high filterability and reduced viscosity of the concentrated solutions thereof;
(d) mixed cellulose esters, i.e., cellulose acetobutyrates and acetopropionates.

The processes mentioned above involve no use of a deficient raw material, are ecologically pure and economically profitable.

BEST METHOD FOR CARRYING OUT THE INVENTION

The catalytic system, according to the invention, is produced as follows:

Variant I (Examples 2, 4, 6, 8, 10, 11 12)
Use of the water-containing parent commercial chemicals A required amount of N,N-dimethylacetamide is added while (stirring to an estimated quantity of a lower fatty acid anhydride. Then a preselected amount of sulfuric acid and in some cases of perchloric acid is added to the resultant solution in small portions while stirring, at such a rate as to cool down the solution by extracting the released heat and to maintain the temperature of the reaction mixture within 0° C. and 25° C.

The thus-produced catalytic system appears as a liquid mixture of an appropriate composition. When acetic anhydride is used, the composition appears as a homogeneous transparent liquid mixture; when butyric anhydride or propionic anhydride is used, the composition is essentially a two-phase liquid mixture of adducts of sulfuric and perchloric acids with N,N-dimethylacetamide of the respective lower fatty acid and free N,N-dimethylacetamide.

Variant II (Examples 1, 3, 5, 7, 9)
Use of 100% water-free parent reagents

An estimated amount of sulfuric acid is added in small portions while stirring to a required amount of N,N-dimethylacetamide at such a rate as to extract the released heat to cool down the reaction mixture and to maintain its temperature at 0° C. to 25° C. The thus-produced catalytic system appears as a homogeneous liquid mixture.

Table 1 contains some specific examples of producing the catalytic system of the invention.

Cellulose acylation, according to the invention, is carried out as follows.

The acetic acid-activated cellulose is subjected to acylation at a temperature of 10° C.–90° C. in the presence of the catalytic system of the invention taken in an amount of 1.5–30 wt. % of the cellulose weight in terms of sulfuric acid for 7–350 minutes until a homogeneous viscous fiber-free solution is obtained, while maintaining the weight ratio of the liquid phase and cellulose equal to (3–7):1. The resultant end product is isolated by the known techniques.

Table 2 contains some specific examples of cellulose acylation in the presence of the catalytic system of the invention.

The process for producing primary acetone-soluble cellulose acetates is carried into effect as follows.

Cellulose activated with acetic acid is acylated with a module of 4–7 at a temperature of 10° C.–90° C. for 75–200 minutes in the presence of the catalytic system of the invention taken in an amount of 20–30 wt. % of the cellulose weight in terms of sulfuric acid, wherein the content of free N,N-dimethylacetamide is 0.2–0.4 mole per mole of an adduct of sulfuric acid with N,N-dimethylacetamide, whereupon the resultant acetate is subjected to treatment in two stages. At the first stage treating at a temperature of 70.0° C.–85.0° C. for 1.0–2.0 hours with 20.0–50.0 wt. pt of water, 25.0–50.0 wt. pt of acetic acid, 10.0–40.0 wt. pt of magnesium acetate or sodium acetate per 100.0 wt. pt of cellulose. At the second stage treating at a temperature of 65° C.–70° C. for 1.0–2.0 hours with 45.0–100.0 wt. pt of water, 45.0–105.0 wt. pt of acetate acid per 100.0 wt. pt of cellulose. The resultant end product is then isolated by the known techniques.

Table 3 contains some examples of producing primary acetone-soluble cellulose acetates.

TABLE 1

Examples of Producing a Catalytic System for Cellulose Acetylation
Parent Composition, Moles

| Example No. 1 | Sulfuric Acid 100% 2 | Sulfuric Acid water 3 | Perchloric Acid 100% 4 | Perchloric Acid water 5 | DMAA 100% 6 | Acetic Anhydride 100% 7 | Propionic Anhydride 100% 8 | Butyric Anhydride 100% 9 |
|---|---|---|---|---|---|---|---|---|
| 1 | 1.0 | — | — | — | 0.67 | — | — | — |
| 2 | 1.0 | 0.35 | — | — | 0.67 | 0.35 | — | — |
| 3 | 1 | — | — | — | 0.97 | — | — | — |
| 4 | 1 | 0.35 | — | — | 0.97 | 0.35 | — | — |
| 5 | 1 | — | — | — | 1.10 | — | — | — |
| 6 | 1 | 0.35 | — | — | 1.10 | 0.35 | — | — |
| 7 | 1 | — | — | — | 1.20 | — | — | — |
| 8 | 1 | 0.35 | — | — | 1.20 | 0.35 | — | — |
| 9 | 1 | — | — | — | 1.40 | — | — | — |
| 10 | 1 | 0.35 | — | — | 1.40 | 0.35 | — | — |
| 11 | 1 | 0.35 | 0.5 | 1.86 | 1.57 | — | 2.2 | — |
| 12 | 1 | 0.15 | 0.5 | 1.86 | 1.57 | — | — | 2.2 |

Mole Composition of the Catalytic System Produced

| Example No. 1 | Temperature °C. 10 | Adduct of Sulfuric Acid with DMAA 11 | Adduct of Perchloric Acid with DMAA 12 | Sulfuric Acid (free) 13 | DMAA (free) 14 | Acetic Acid 15 | Propionic Acid 16 | Butyric Acid 17 |
|---|---|---|---|---|---|---|---|---|
| 1 | 10.0 | 1 | — | 0.49 | — | — | — | — |
| 2 | 10.0 | 1 | — | 0.49 | — | 0.70 | — | — |
| 3 | 15 | 1 | — | 0.03 | — | — | — | — |
| 4 | 15 | 1 | — | 0.03 | — | 0.70 | — | — |
| 5 | 20 | 1 | — | — | 0.10 | — | — | — |
| 6 | 20 | 1 | — | — | 0.10 | 0.70 | — | — |
| 7 | 5 | 1 | — | — | 0.20 | — | — | — |
| 8 | 5 | 1 | — | — | 0.20 | 0.70 | — | — |
| 9 | 0 | 1 | — | — | 0.40 | — | — | — |
| 10 | 0 | 1 | — | — | 0.40 | 0.70 | — | — |
| 11 | 25 | 1 | 0.5 | — | 0.07 | — | 4.4 | — |
| 12 | 25 | 1 | 0.5 | — | 0.07 | — | — | 4.4 |

TABLE 2

Examples of Cellulose Acylation in the Presence of the Proposed Catalytic System
(in terms of 100 wt. pt. of 100% cellulose)
Parent Components, wt. pt.

| Nos. 1 | Cellulose 2 | Acetic Acid for Activation 3 | Acetic Acid for Acylation 4 | Acetic Anhydride 5 | Propionic Anhydride 6 | Butyric Anhydride 7 | Sulfuric Acid 8 | Perchloric Acid 9 | N,N-dimethylacetamide 10 |
|---|---|---|---|---|---|---|---|---|---|
| 1 | powdery | 10 | — | 272 | — | — | 1.5 | — | 0.88 |
| 2 | powdery | 10 | — | 273 | — | — | 7 | — | 6.04 |
| 3 | powdery | 50 | 100 | 279 | — | — | 7 | — | 6.84 |
| 4 | wood | 50 | — | 283 | — | — | 5 | — | 4.12 |
| 5 | wood | 50 | 337 | 283 | — | — | 7 | — | 7.46 |
| 6 | wood | 50 | — | 283 | — | — | 7 | — | 7.46 |
| 7 | wood | 50 | — | 273 | — | — | 10 | — | 10.65 |
| 8 | wood | 50 | — | 283 | — | — | 15 | — | 14.65 |
| 9 | powdery | 50 | — | 283 | — | — | 15 | — | 16.00 |
| 10 | cotton | 50 | 100 | 293 | — | — | 20 | — | 21.30 |
| 11 | wood | 50 | — | 283 | — | — | 20 | — | 19.50 |
| 12 | wood | 50 | 321 | 283 | — | — | 15 | — | 14.65 |
| 13 | wood | 50 | — | 283 | — | — | 30 | — | 32.00 |

TABLE 2-continued

Examples of Cellulose Acylation in the Presence of the Proposed Catalytic System
(in terms of 100 wt. pt. of 100% cellulose)
Parent Components, wt. pt.

| 14 | wood   | 50 | —   | 283 | —   | —   | 30 | —  | 37.30 |
|----|--------|----|-----|-----|-----|-----|----|----|-------|
| 15 | cotton | 42 | —   | —   | —   | 469 | 10 | 5  | 14.10 |
| 16 | cotton | 42 | —   | —   | —   | 508 | 20 | 10 | 28.20 |
| 17 | cotton | 42 | —   | —   | 386 | —   | 10 | 5  | 14.10 |
| 18 | cotton | 42 | —   | —   | 418 | —   | 20 | 10 | 28.20 |
| 19 | cotton | 50 | 100 | 283 | —   | —   | 20 | —  | 17.80 |

| | Mole Composition of | | | | Acylation | | | | Characteristics of cellulose esters | | |
|---|---|---|---|---|---|---|---|---|---|---|---|
| | | Catalytic System | | | | | | | | Weight | |
| | | Adduct | | | parameters | | | Solu- | Propor- | Degree |
| Nos. 1 | Acylation Module 11 | of Sulfuric Acid 12 | Adduct of Perchloric Acid 13 | Sulfuric Acid (free) 14 | N,N-dime-thylacetamide 15 | Temp-erature °C. 16 | Time, Min. 17 | bility in Acetone 18 | tion of fixed Fatty Acid 19 | of Poly-meri-zation 20 |
| 1  | 3.0 | 1 | —   | 0.490 | —    | 64–68 | 15  | insoluble | 61.7 | 230 |
| 2  | 3.1 | 1 | —   | 0.030 | —    | 64–68 | 15  | insoluble | 60.5 | 155 |
| 3  | 4.6 | 1 | —   | —     | 0.10 | 10–62 | 150 | insoluble | 60.8 | 260 |
| 4  | 3.6 | 1 | —   | 0.076 | —    | 64–68 | 10  | insoluble | 61.3 | 170 |
| 5  | 7.0 | 1 | —   | —     | 0.20 | 20–70 | 190 | insoluble | 61.0 | 300 |
| 6  | 3.6 | 1 | —   | —     | 0.20 | 20–70 | 100 | insoluble | 61.0 | 290 |
| 7  | 3.6 | 1 | —   | —     | 0.20 | 20–70 | 90  | insoluble | 60.0 | 250 |
| 8  | 3.8 | 1 | —   | —     | 0.10 | 20–70 | 75  | insoluble | 59.2 | 300 |
| 9  | 3.8 | 1 | —   | —     | 0.20 | 20–90 | 75  | insoluble | 58.9 | 160 |
| 10 | 5.0 | 1 | —   | —     | 0.20 | 12–68 | 135 | soluble   | 58.0 | 300 |
| 11 | 3.9 | 1 | —   | —     | 0.10 | 12–62 | 110 | soluble   | 57.5 | 220 |
| 12 | 7.0 | 1 | —   | —     | 0.10 | 20–70 | 170 | insoluble | 59.0 | 320 |
| 13 | 4.1 | 1 | —   | —     | 0.20 | 20–60 | 90  | soluble   | 56.5 | 180 |
| 14 | 4.2 | 1 | —   | —     | 0.40 | 20–65 | 150 | soluble   | 56.2 | 280 |
| 15 | 5.5 | 1 | 0.5 | —     | 0.07 | 20–75 | 330 | soluble   | 53.5 |     |
| 16 | 6.4 | 1 | 0.5 | —     | 0.07 | 20–75 | 210 | soluble   | 53.0 |     |
| 17 | 4.8 | 1 | 0.5 | —     | 0.07 | 20–75 | 330 | soluble   | 49.5 |     |
| 18 | 5.5 | 1 | —   | —     | 0.07 | 20–75 | 210 | soluble   | 49.0 |     |
| 19 | 5.0 | 1 | —   | —     | —    | 20–75 | 45  | soluble   | 58.2 | 180 |

All cellulose esters produced are soluble in a methylenechloride-ethanol mixture (9:1).

TABLE 3

Examples of Producing Primary Acetone-Soluble Cellulose Acetates (in terms of 100 wt. pt. of 100% cellulose)
Parent Components, wt. pt.

| Nos. 1 | Cellulose 2 | Acetic Acid for Activation 3 | Acetic Acid for Acetylation 4 | Acetic Anhydride 5 | Sulfuric Acid 6 | N,N-dimethyl-acetamide 7 | Acetylation Module 8 |
|---|---|---|---|---|---|---|---|
| 1  | cotton  | 52.5 | 100  | 293 | 20 | 21.3 | 5.0 |
| 2  | wood    | 42.0 | 12.5 | 297 | 20 | 21.3 | 4.0 |
| 3  | cotton  | 52.5 | 100  | 293 | 20 | 21.3 | 5.0 |
| 4  | wood    | 52.0 | 100  | 297 | 20 | 21.3 | 5.0 |
| 5  | cotton  | 52.0 | 12.5 | 297 | 25 | 26.6 | 4.3 |
| 6  | powdery | 19.0 | —    | 293 | 30 | 37.3 | 4.0 |
| 7  | wood    | 42.0 | 299  | 288 | 20 | 21.3 | 7.0 |
| 8  | wood    | 42.0 | —    | 290 | 30 | 34.6 | 4.3 |
| 9  | wood    | 42.0 | 12.5 | 297 | 20 | 25.0 | 4.1 |
| 10 | wood    | 42.0 | 284  | 290 | 30 | 37.3 | 7.0 |
| 11 | wood    | 52.5 | 100  | 297 | 20 | 21.3 | 5.0 |
| 12 | cotton  | 52.5 | 100  | 293 | 20 | 21.3 | 5.0 |

| Mole Composition of Catalytic System | | Acetylation Parameters | | Reagents for Water Treatment, wt. pt. | | | | |
|---|---|---|---|---|---|---|---|---|
| | | | | Stage 1 | | Magnes- | Stage 2 | |
| Sulfuric Acid | Free N,N-Dimethylace- | Temp-erature | Time, | | Acetic | ium acetate/ | | |
| Nos. 1 | Adduct 9 | tamide 10 | °C. 11 | Min. 12 | Water 13 | Acid 14 | sodium acetate 15 | Water 16 | Acetic acid 17 |

TABLE 3-continued

Examples of Producing Primary Acetone-Soluble Cellulose Acetates (in terms of 100 wt. pt. of 100% cellulose)
Parent Components, wt. pt.

| Nos. | | | | | | | | | |
|---|---|---|---|---|---|---|---|---|---|
| 1  | 1 | 0.2 | 12–68 | 140 | 33.0 | 29.0 | 22/— | 60 | 63 |
| 2  | 1 | 0.2 | 20–65 | 75  | 27.0 | 27.0 | 22/— | 48 | 48 |
| 3  | 1 | 0.2 | 13–67 | 140 | 33.0 | 29.0 | 22/— | 60 | 63 |
| 4  | 1 | 0.2 | 14–67 | 135 | 33.0 | —    | —/12.6 | 64 | 63 |
| 5  | 1 | 0.2 | 20–85 | 90  | 27.0 | 27.0 | 29/— | 48 | 48 |
| 6  | 1 | 0.4 | 18–67 | 180 | 27.0 | 30.0 | 36/— | 48 | 48 |
| 7  | 1 | 0.2 | 20–65 | 150 | 50.0 | 50.0 | 22/— | 96 | 101 |
| 8  | 1 | 0.3 | 20–75 | 120 | 27.0 | 27.0 | 36/— | 48 | 48 |
| 9  | 1 | 0.4 | 20–90 | 200 | 27.0 | 27.0 | 22/— | 48 | 48 |
| 10 | 1 | 0.4 | 20–65 | 150 | 50.0 | 50.0 | 36/— | 98 | 102 |
| 11 | 1 | 0.2 | 11–70 | 150 | 33.0 | —    | 22/— | 64 | 63 |
| 12 | 1 | 0.2 | 15–66 | 140 | 33.0 | 33.0 | 13.7/ | 60 | 63 |

| | Water Treatment Parameters | | Properties of Acetone-Soluble Cellulose Acetate | | | |
|---|---|---|---|---|---|---|
| | Stage 1 | Stage 2 | | | | |
| Nos. 1 | Temperature °C. 18 | Temperature °C. 19 | Weight Proportion of fixed acetic acid, % 20 | Weight Proportion of fixed sulfuric acid, % 21 | Degree of polymerization 22 | Filterability, g/cm² 23 |
| 1  | 70–82 | 65    | 57.7 | 0.030 | 365 | 15 |
| 2  | 85    | 70    | 56.3 | 0.030 | 220 | —  |
| 3  | 70–83 | 65    | 57.5 | 0.001 | 315 | 25 |
| 4  | 70–80 | 65–70 | 56.0 | 0.080 | 250 | 15 |
| 5  | 85    | 70    | 55.5 | 0.030 | 200 | —  |
| 6  | 85    | 70    | 56.6 | —     | 450 | —  |
| 7  | 80    | 65    | 57.0 | 0.030 | 280 | 20 |
| 8  | 80    | 70    | 55.5 | —     | 280 | —  |
| 9  | 85    | 70    | 57.2 | 0.020 | 300 | —  |
| 10 | 85    | 70    | 56.0 | 0.030 | 320 | 25 |
| 11 | 82    | 65    | 56.0 | 0.010 | 255 | 15 |
| 12 | 70–80 | 65–70 | 55.0 | 0.080 | 270 | 25 |

Note:
In Examples 2, 3, 4, 6, 11, and 12, specific volume charging of the reactor with cellulose is 50 kg per cubic meter.

INDUSTRIAL APPLICABILITY

The present invention can be utilized for modernizing the now-existing industrial processes for producing cellulose esters. Such a modernization can provide a reduced dilution module at the principal stages of the process, and a decreased amount of recoverable organic solvents with a high-quality finish. The invention has the most utility when applied for developing a basically novel continuous process for producing cellulose acetates without using any organic solvents.

While several embodiments of the present invention have been shown and described, it is to be understood that many changes and modifications may be made thereunto without departing from the spirit and scope of the invention as defined in the appended claims.

What is claimed is:

1. A catalytic system for cellulose acylation for use in an acylating mixture composition, comprising
an adduct of sulfuric acid with N,N-dimethylacetamide, a lower fatty acid having from 2 to 4 carbon atoms, free sulfuric acid or free N,N-dimethylacetamide, with the following mole ratio of components:
adduct 1.0
lower fatty acid, max. 14.0
free sulfuric acid, max. 0.49
or
free N,N-dimethylacetamide, max 0.4.

2. A catalytic system according to claim 1, further comprising
an adduct of perchloric acid with N,N-dimethylacetamide in an amount of 0.5 mole per mole of an adduct of sulfuric acid with N,N-dimethylacetamide.

3. A method for preparing a catalytic system for use in cellulose acylation, said catalytic system being part of an acylating mixture and comprising
an adduct of sulfuric acid with N,N-dimethylacetamide, a lower fatty acid having from 2 to 4 carbon atoms, free sulfuric acid or free N,N-dimethylacetamide, with the following mole ratio of the components:
adduct 1.0
lower fatty acid, max. 14.0
free sulfuric acid, max. 0.49
or
free N,N-dimethylacetamide, max 0.4
comprising providing hydrous sulfuric acid and hydrous N,N-dimethylacetamide and reacting both with each other in the presence of a lower fatty acid anhydride in an amount of at least 1.0 mole of said anhydride per mole of water in the absence of cellulose at a temperature of from 0° C. to 25° C. with the following mole ratio of reactants expressed as a percentage:
sulfuric acid 1.0
N,N-dimethylacetamide 0.67–1.4.

4. A method according to claim 3, comprising
reacting sulfuric acid with N,N-dimethylacetamide in the presence of perchloric acid in an amount of 50.0 wt % of the amount of sulfuric acid.

* * * * *